United States Patent [19]

Thomas

[11] 4,269,579
[45] May 26, 1981

[54] APPARATUS FOR INJECTION MOLDING AGAINST A PREFORMED WEB

[75] Inventor: Berwyn C. Thomas, Harrogate, England

[73] Assignee: Imperial Chemical Industries Limited, London, England

[21] Appl. No.: 114,351

[22] Filed: Jan. 22, 1980

Related U.S. Application Data

[62] Division of Ser. No. 830,768, Sep. 6, 1977, Pat. No. 4,216,184.

[30] Foreign Application Priority Data

Sep. 13, 1976 [GB] United Kingdom ............... 37831/76

[51] Int. Cl.³ .......................... B29C 1/00; B29C 3/04
[52] U.S. Cl. .................................. 425/111; 425/112; 425/122; 425/126 R; 425/127; 425/129 R; 425/383; 425/394; 425/412; 425/542
[58] Field of Search ............... 425/111, 145, 112, 122, 425/127, 129 R, 126 R, 116, 117, 383, 394, 412, 521, 542, 445; 226/128, 162, 195; 264/266, 250, 255, 550, 557, 259, 229, 231, 328.1, 292, 257, 279, 294, 513

[56] References Cited

U.S. PATENT DOCUMENTS

| | | | |
|---|---|---|---|
| 1,373,405 | 4/1921 | Brown | 264/258 |
| 1,904,268 | 4/1933 | Bronson | 264/294 |
| 2,745,164 | 5/1956 | Ros | 425/111 |
| 3,384,281 | 5/1968 | Mason | 226/195 |
| 3,594,262 | 7/1971 | Magidson | 264/292 |
| 3,659,767 | 5/1972 | Martin | 226/195 |
| 3,849,042 | 11/1974 | Anderegg | 425/129 R |
| 3,904,145 | 9/1975 | Steinberger et al. | 226/195 |
| 3,904,338 | 9/1975 | Straumanis | 425/145 |
| 4,029,453 | 6/1977 | Campion | 425/111 |

FOREIGN PATENT DOCUMENTS

| | | |
|---|---|---|
| 1182413 | 11/1964 | Fed. Rep. of Germany. |
| 2338781 | 1/1976 | France. |
| 37-13054 | 9/1962 | Japan. |
| 48-81950 | 11/1973 | Japan. |
| 50-28463 | 5/1975 | Japan. |
| 464436 | 4/1937 | United Kingdom. |

*Primary Examiner*—W. E. Hoag
*Attorney, Agent, or Firm*—Cushman, Darby & Cushman

[57] ABSTRACT

Apparatus for injection-moulding articles of plastics material onto a preformed web inserted into the mould, the web is held under substantially constant tension during the closing of the mould, between a pair of clamps, the proximal clamp being fixed relative to the mould and the distal clamp free but bearing a load to furnish the desired tension in the web. The load may be imposed by a weight attached to the distal clamp, conveniently by means of an electromagnet.

8 Claims, 3 Drawing Figures

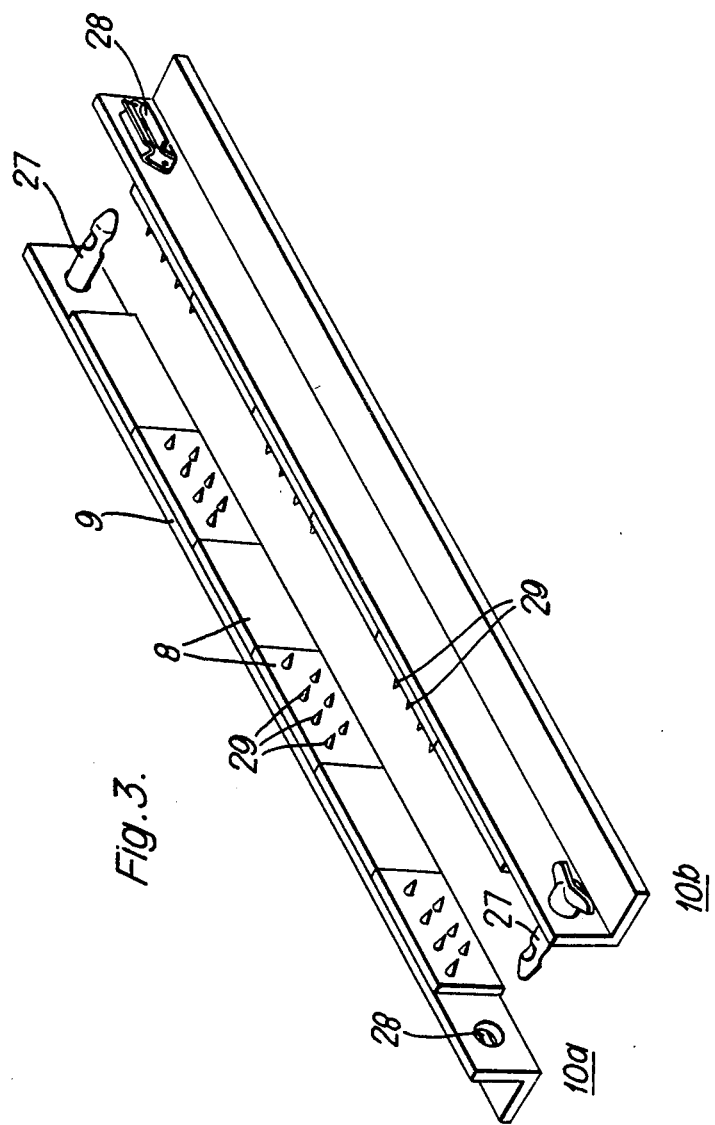

APPARATUS FOR INJECTION MOLDING AGAINST A PREFORMED WEB

This is a division of application, Ser. No. 830,768, filed Sept. 6, 1977 and now U.S. Pat. No. 4,216,184.

This invention relates to a method and apparatus for injection moulding plastics material onto a preformed web held in tension and inserted into core and cavity mould.

It has been discovered that the tendency for a web to wrinkle can be reduced by holding the web under a controlled (preferably constant) tension applied by a load during closing of the mould especially if the tension can be applied uniformly across the width of the web. However it is difficult to control the tension accurately when the web is being made to conform to the shape of the core during the closing of the mould because that operation involves movement of the web against the load and therefore generates complex reactions in the web which need to be accommodated in a way which does not interfere with efficient closing and opening of the mould. The primary objective of this invention is to provide a simple method and apparatus for applying a positively controlled tension to a web during the closing of an injection mould. A secondary objective is to refine the method and apparatus to improve their suitability for use when the web has a free distal end which is easily blown by random air currents and is therefore difficult to locate and engage in a tensioning device, especially in an automated continuous process.

Accordingly this invention provides a method for injection moulding plastics material onto a preformed web held in tension by a load and inserted into a core and cavity mould in which the web is caused to conform to the shape of the core during the closing of the mould by an operation involving movement of the web against the load wherein the tension in the web is controlled by a load applied by a tensioning device engaged with the web and which is free to move with the web as it moves against the load. Allowing the tensioning device freedom to move with the web has been found adequate to enable it to compensate sufficiently for the complex reactions in the web generated during the closing of the mould. The tensioning device therefore exerts an accurate and positive control on the tension in the web during closing of the mould.

The tension may be varied or preferably kept constant during the closing of the mould. More preferably the tension is kept constant during the initial closing of the mould but is made to undergo a stepped increase prior to completion of the closing of the mould. Preferably the tension remains constant after the stepped increase. Alternatively the tension may be controlled so as to allow an even increase in tension during at least part of the time while the mould is closing. In order that the web be held in tension it should be engaged by means fixed relative to the mould to hold the web against the load.

Apparatus for performing this invention comprises an injection mould having a core and cavity in which plastics material can be moulded onto a web held in tension by a load, a tensioning device engageable with the web for applying a load to the web, the device being free to move with the web as it moves against the load as a result of the closing of the mould and means for holding the web against the load.

The tensioning device may be any device capable of exerting a load on the web so as to tension the web provided that the device is free to move with the web as it moves against the load. Fastening means should be provided for engaging the tensioning device with the web and accordingly the tensioning device preferably comprises a free clamp (i.e. free in that it is not fixed relative to the mould). Preferably the fastening means is engageable with the web across its whole width to create a more uniform tension in the web. A load may be provided by the weight of the fastening means (e.g. free clamp) but it is preferred to attach loading means to the fastening means at least for tensioning the web during closing of the mould. Dead weights are the simplest loading means when the method is to be performed using a downwards load acting on a vertically hanging web. To facilitate automation one or more dead weights may be attached to the free clamp by means of an electromagnet acting on ferromagnetic (especially soft iron) material of the clamp. Preferably a dead weight attachable to the clamp may additionally be coupled to a second dead weight by a lost motion coupling.

The means fixed relative to the mould for holding the web against the load may be provided by paying out stepwise preferably predetermined lengths of web from a continuous web so that after a length has been paid out its proximal portion is held stationary by the paying out device. Although this provides useful means for holding the web in tension while fastening means (especially clamps) are being engaged with the web it is preferred to use firmer holding means to hold the web against the preferably greater loads used to tension the web during the closing of the mould. For example suitable firmer means may comprise a permanently or preferably releasably fixed clamp engaging a portion of the web (preferably a proximal portion) located to the side of the mould remote from the tensioning device.

Because continuous webs are generally supplied in rolls, the method of this invention is most conveniently performed on a length of web paid out from a roll even though this means that the web will have a distal end which is free and therefore difficult to locate. The supply roll may be adapted to pay out stepwise predetermined lengths of web so that having paid out a length the roll locks and acts as a means for holding the web against the load. The predetermined length should be long enough to allow the web to be inserted into the mould leaving its distal end protruding from the mould. Preferably a supply roll is mounted above the mould and sufficient web is paid out stepwise to allow the distal end of the web to hang below the mould for engagement by the tensioning device.

To facilitate engagement of the tensioning device with a distal end of the web, this invention also provides a refined method in which the refinement comprises holding a portion of the web in tension between a pair of interchangeable fastening means (preferably clamps) suitable for engaging the tensioning device with the web, one of the fastening means being engaged with the distal portion of the web and the other with a proximal portion, then moulding plastics material onto an intervening portion of web located between the fastening means and subsequently severing the moulded intervening portion from the proximal portion on the distal side of the fastening means engaging the proximal portion so creating a new distal portion of the web on which a fastening means is already engaged then with the web held in tension by a load exerted on its new distal portion, engaging an interchangeable fastening means proximally of its new distal portion whereafter the method may be repeated by moulding onto the new intervening portion of web.

By engaging the fastening means (clamps) on a proximal portion of the web the difficulty in locating a free distal end of the web is avoided. Additionally it has been discovered that the distal end is already loaded, the engagement can be made with greater precision. Clearly the fastening means engaging the proximal portion of the web may conveniently be a fastening means previously taken from a former distal portion of the web.

Refined apparatus for facilitating engagement of the tensioning device with the distal end of the web comprises means for paying out stepwise (preferably predetermined lengths of web), a tensioning device having a first fastening means (preferably a clamp) suitable for engaging the tensioning device with a distal end of the web, a second fastening means interchangeable with the first and means for engaging the second fastening means to a proximal portion of the web.

To start up the continuous process, an interchangeable clamp may be engaged manually on the distal end of the web before it is passed between the core and cavity. Thereafter clamps are engaged on proximal portions of the web preferably automatically. Provided a suitably isotropic web is used and the clamps are being applied automatically it is often found that the tension in the web settles down to being uniform and in particular any major distortions caused by imprecise manual engagement of the first clamp are quickly eradicated.

Typical web materials are woven cloths, fibrous felts, paper and film. Preferably the web is a non-woven cloth having a thickness of at least 0.6 mm (preferably 0.8 to 4 mm) and a weight of 50 to 250 $g/m^2$ (preferably 80 to 150 $g/m^2$). Preferably the cloths should be able to stretch elastically by at least 15% and more preferably by at least 30% both lengthwise and transverse of the web. Preferred isotropic cloths are knitted cloths and melded cloths, that is to say a cloth which comprises at least 25% by weight of contiguous conjugate fibres at least some of which are fused together where they touch one another. A conjugate fibre comprises two mutually adhering fibre-forming components and the surface of the fibre is formed at least partly of a component which can be rendered fusible by a treatment which does not significantly affect the other component so as to enable contiguous fibres to be fused together. 'Cambrelle' (trade mark of Imperial Chemical Industries Limited) is a melded cloth.

Examples of melded cloths which may be used in the performance of this invention are described in United Kingdom patent specification 1 245 088. The melded cloths may additionally comprise fibres other than conjugate fibres such as cotton, wool, polyethylene terephthalate, nylon or polypropylene fibres. The term "fibre" is used to include not only staple fibres but also filaments and yarns in general. Preferred conjugate fibres include fibres comprising a core of nylon 66 or polyethylene terephthalate in contact with or preferably sheathed in nylon 6 or a nylon 6/nylon 66 copolymer or a polyethylene terephthalate/isophthalate copolymer. The terephthalate/isophthalate copolymer preferably comprises from 5 to 25% by weight of copolymerised isophthalic acid. Alternatively the conjugate fibre may comprise a core of polypropylene in contact with nylon 6 or polyethylene.

The plastics material is preferably thermoplastic although a thermosetting material may be employed if desired. Crystalline polyolefins, particularly homopolymers and copolymers of propylene and ethylene, and copolymers of ethylene with up to 40% by weight of unsaturated carboxylic esters such as vinyl acetate and alkyl acrylates and methacrylates, are preferred. Nylon, polyvinylchloride and polystyrene may also be used.

The invention is further illustrated by the following preferred embodiment described with reference to the drawings in which, FIG. 1 shows in section and in simplified manner an open injection mould and a web engaged by clamps.

FIG. 3 shows on a larger scale and in perspective one of the interchangeable clamps shown in FIGS. 1 and 2.

Figure 1:
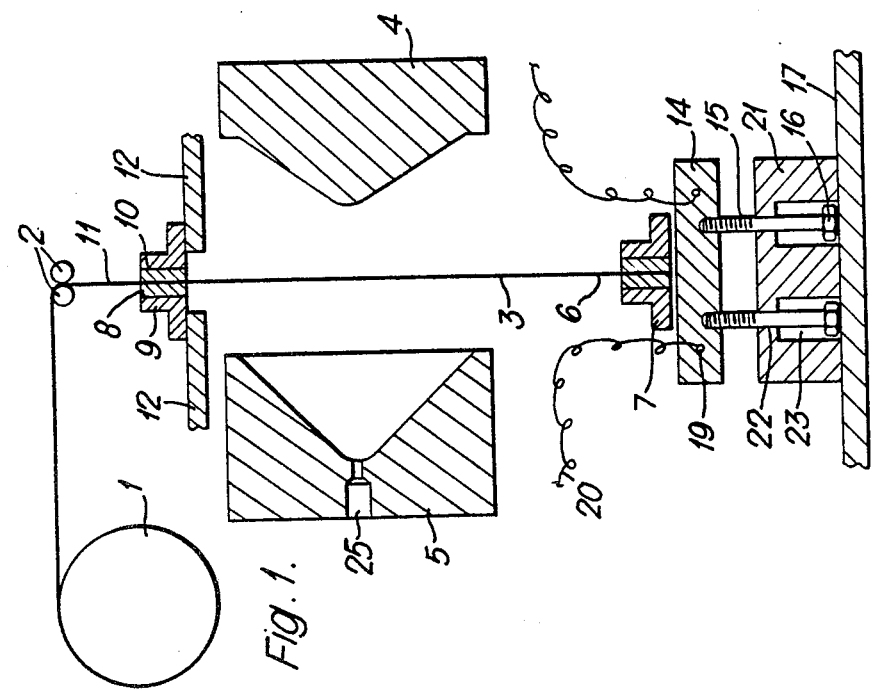

FIG. 1 shows a supply roll 1 adapted by means not shown to pay out repeatedly and stepwise through nip rolls 2 a predetermined length of a web 3 of melded cloth which is long enough to hang vertically downwards between core 4 and cavity 5 of an open injection mould with its distal portion 6 below the mould. A free clamp 7 comprising soft rubber pads 8 and soft iron angles 9 is releasably engaged across the whole width of distal portion 6 whereupon the weight of clamp 7 lightly loads web 3 which is held against the light load by the stepwise action of supply roll 1 thus ensuring web 3 is in tension. A second clamp 10 located to the side of the mould remote from clamp 7 interchangeable with clamp 7 is releasably engaged on proximal portion 11 of lightly tensioned web 3 located at a height such that clamp 10 stands on retractable supports 12 which keep clamp 10 at a fixed vertical distance from core 4 and cavity 5 and enable web 3 to be tensioned by heavier loads.

Clamp 7 is positioned closely above a soft iron dead weight 14. Dead weight 14 is supported on bolts 15 whose heads 16 stand on shelf 17. Dead weight 14 contains a electromagnet 19 energisable by leads 20 so that on energising electromagnet 19 dead weight 14 attaches itself to soft iron angle 9 of clamp 7 augmenting the load exerted on web 3.

Bolts 15 pass through a non-magnetisable dead weight 21 resting on shelf 17. Bolts 15 make a clearance fit in narrow bores 22 formed in the top part of dead weight 21 and their heads 16 make a clearance fit in wider blind bores 23 formed in the lower part of dead weight 21 so that on raising bolts 15 their heads 16 engage the blind end of blind bore 23 and then lift the non-magnetisable dead weight 21 to cause a stepped increase in tension in the web 3. Bolts 15 therefore act as a lost motion coupling.

Figure 2:
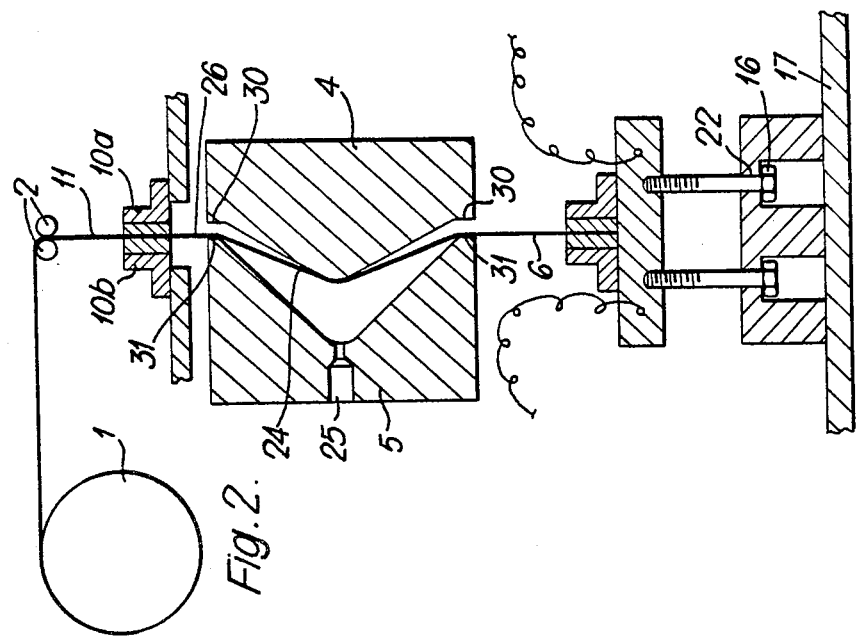
FIG. 2 shows the mould of FIG. 1 after it has been closed to an almost closed position.

FIG. 2 shows the injection mould as it is being closed. Clamp 10 stands on supports 12 and electromagnet 19 is energised so as to attach dead weight 14 to clamp 7. Core 4 has been advanced into cavity 5 and has impinged on intervening portion 24 of web 3 between clamps 7 and 10. Therefore core 4 inserts intervening portion 24 into cavity 5 causing it to begin conforming to the shape of core 4 which operation involves a movement of web 3 upwards against the heavier load exerted by clamp 7 when augmented by dead weight 14. Because clamp 7 and dead weight 14 are free to move with web 3, they move upwards as intervening portion 16 of web 3 is caused to conform to the shape of core 4. Accordingly clamp 7 and dead weight 14 immediately accommodate any complex reactions generated in the web as the mould closes so they are able to exert an accurate and positive control on the tension in web 3.

The tension in web 3 is kept constant until the mould reaches the almost closed position shown in FIG. 2 where bolts 15 acting as a lost motion coupling have been raised sufficiently for the their heads 16 to engage the blind ends of blind bores 23. Further closing of the mould causes bolts 15 to lift non-magnetisable dead weight 21 whereupon the load on web 3 suffers a stepped increase which thereafter is kept constant during the final closing of the mould. When the mould is fully closed shoulders 30 and 31 of core 4 and cavity 5 grip web 3 preventing further movement of web 3 against the load. Plastics material is then injected into the closed mould via gate 25 onto intervening portion 24 of web 3 and allowed to cool until it becomes form-stable.

In a continuous process, supply roll 1 pays out a predetermined length of web 3. Clamp 7 is engaged on the distal end 6 of the web 3 which is then passed between core 4 and cavity 5 to take a position below the mould as shown in FIG. 1. Clamp 10 is engaged on proximal portion 11 of web 3, the two components 10a and 10b being delivered automatically from magazines which are not shown. Electromagnet 19 is energised and dead weight 14 attaches to clamp 7 augmenting the load on web 3 which is held by clamp 10 standing on supports 12. The mould is closed and plastics material is injection moulded onto intervening portion 24 of web 3 and allowed to cool until it is form-stable. Then electromagnet 19 is de-energised allowing the dead weights 14 and 21 to fall from clamp 7. Clamp 7 is detached from distal end 6 and its two components are charged to the magazines ready for engagement with a subsequent proximaled portion of web 3.

The intervening portion 24 of web 3 is severed along a line passing through a point 26 on the distal side of clamp 10 creating a new distal portion of web 3 to which clamp 10 is engaged. The mould is opened and the moulded intervening portion 24 of web 3 is removed. Retractable supports 12 are retracted and supply roll 1 is caused to pay out a new predetermined length of web 3 whereupon clamp 10 passes between core 4 and cavity 5 to take up the position formerly occupied by free clamp 7. Hence a free clamp is provided on the new distal portion of web 3 without the need to locate a free distal end and the process is now ready for repetition.

FIG. 3 shows a two component clamp 7 or 10 suitable for use in the performance of this invention. Clamp 7 or 10 comprises two components 10a and 10b coupleable together by co-operating latch members 27 and 28 and comprising soft iron angles 9 and soft rubber pads through which protrude stenter pins 29 for impaling the web 3 when the clamps are engaged.

An even increase in tension can be applied to web 3 by replacing dead weight 14 by lengths of chains resting on shelf 17 but with one end of each chain attached to dead weight 14.

Core and cavity portions of an injection mould are alternatively called male and female portions.

I claim:

1. Apparatus for injection moulding thermoplastics material onto a preformed web paid out so as to pass between closable core and cavity components of an injection mould and so as to have a free distal end protruding below the mould components, and a proximal portion above the mould components, said apparatus comprising: an injection mould having closable core and cavity components; engaging means for engaging a load on the free distal end of the preformed web protruding below the mould components; a load engageable on a said distal end by the engaging means, the load being free to move with a distal end on which it is engaged; and holding means located above and fixed relative to the mould components for holding a proximal portion of a web against a load engaged on a distal end of the web below the mould components, whereby when the mould components are closed onto a preformed web located between the components they cause a free distal end of a web protruding below the components to move in response to the closing of the mould whereupon the load attached to such a distal end moves with the distal end and controls the tension in the web during the closing of the mould.

2. Apparatus according to claim 1 wherein the load comprises one or more dead weights.

3. Apparatus according to claim 2 including an electromagnet by which a dead weight can be attached to the engaging means.

4. Apparatus according to claim 3 including means located within a dead weight made of soft iron, said means being energisable to produce an electromagnet.

5. Apparatus according to any one of claims 2 to 4 including a first dead weight which is attachable to the engaging means, a second dead weight and a lost motion coupling which attaches the second dead weight to the first dead weight, whereby the second dead weight only moves with the first dead weight after the first dead weight has already moved during the closing of the mould thereby a stepped increase in the load occurs during the closing of the mould.

6. Apparatus according to any one of claims 1 to 4 wherein the holding means comprises a clamp releasably fixed relative to the mould components.

7. Apparatus according to any one of claims 1 to 4 including means to pay out stepwise predetermined lengths of web each long enough to be passable between the mould components so as to leave a free distal end protruding below the mould components.

8. Apparatus according to any one of claims 1 to 4 including means for paying out lengths of web stepwise and fastening means which is interchangeable with the holding means.

* * * * *